US009976634B2

(12) United States Patent
Leucht et al.

(10) Patent No.: US 9,976,634 B2
(45) Date of Patent: May 22, 2018

(54) ROTARY TENSIONER

(71) Applicant: GATES CORPORATION, Denver, CO (US)

(72) Inventors: Volker Leucht, Eschweiler (DE); Arnaud Martinez, Aachen (DE); Jochen Dilthey, Aachen (DE)

(73) Assignee: Gates Corporation, Denver, CO (US)

( * ) Notice: Subject to any disclaimer, the term of this patent is extended or adjusted under 35 U.S.C. 154(b) by 141 days.

(21) Appl. No.: 15/203,389

(22) Filed: Jul. 6, 2016

(65) Prior Publication Data
US 2018/0010670 A1    Jan. 11, 2018

(51) Int. Cl.
F16H 7/12    (2006.01)
F16H 7/08    (2006.01)
F02B 67/06   (2006.01)

(52) U.S. Cl.
CPC .......... F16H 7/1245 (2013.01); F02B 67/06 (2013.01); F16H 7/0831 (2013.01); F16H 7/0838 (2013.01); F16H 2007/081 (2013.01); F16H 2007/0865 (2013.01); F16H 2007/0874 (2013.01); F16H 2007/0893 (2013.01); F16H 2007/0897 (2013.01)

(58) Field of Classification Search
CPC ............. F16H 2007/081; F16H 7/1218; F16H 7/1281; F16H 2007/0893; F16H 2007/0874
USPC ........................................................ 474/134
See application file for complete search history.

(56) References Cited

U.S. PATENT DOCUMENTS

| 315,735 A | 4/1885 | Colburn |
|---|---|---|
| 976,115 A | 11/1910 | Bard |
| 1,433,958 A | 10/1922 | Laughton |
| 1,805,326 A | 5/1931 | Bunker et al. |
| 2,954,726 A | 10/1960 | Kerridge |
| 4,564,098 A | 1/1986 | Hoermann |
| 4,698,049 A | 10/1987 | Bytzek et al. |
| 4,758,208 A | 7/1988 | Bartos et al. |

(Continued)

FOREIGN PATENT DOCUMENTS

| DE | 508156 C | 9/1930 |
|---|---|---|
| DE | 19631507 A1 | 2/1998 |

(Continued)

OTHER PUBLICATIONS

European Patent Office, International Search Report patent application No. PCT/US2017/038080; dated Aug. 22, 2017.

*Primary Examiner* — Henry Y Liu
(74) *Attorney, Agent, or Firm* — Jeffrey A. Thurnau, Esq.; Paul N. Dunlap, Esq.

(57) ABSTRACT

A tensioner comprising a base having a base aperture, the base aperture disposed to receive a driven component, a rotary arm pivotally engaged with the base, an axis of rotation of the rotary arm aligned with a base aperture center, a first pulley journalled to the rotary arm, a swing arm pivotally engaged with the rotary arm about a shaft, the shaft and swing arm each having cooperating frustoconical portions, a torsion spring biasing the pivot arm, a second pulley journalled to the swing arm, a bushing having a frustoconical portion in frictional engagement with the swing arm frustoconical portion, the bushing in fixed relation to the shaft or pivot arm, and a first damping ring frictionally engaged between the rotary arm and the base, a Belleville spring in pressing engagement whereby a normal force is applied to the first damping ring.

12 Claims, 5 Drawing Sheets

(56) References Cited

U.S. PATENT DOCUMENTS

| | | |
|---|---|---|
| 4,981,116 A | 1/1991 | Trinquard |
| 5,221,236 A | 6/1993 | Raymer |
| 5,725,450 A | 3/1998 | Huskey et al. |
| 5,776,025 A | 7/1998 | Labudde et al. |
| 6,117,034 A | 9/2000 | Vine |
| 6,511,393 B1 | 1/2003 | Bogl et al. |
| 6,609,989 B2 | 8/2003 | Bogner et al. |
| 6,648,783 B1 | 11/2003 | Bogner |
| 6,689,001 B2 | 2/2004 | Oliver et al. |
| 6,736,743 B2 | 5/2004 | Fletcher et al. |
| 6,830,524 B2 | 12/2004 | Tamai |
| 6,857,978 B2 | 2/2005 | Polster et al. |
| 6,960,145 B2 | 11/2005 | Fraley, Jr. et al. |
| 7,468,013 B2 | 12/2008 | Di Giacomo et al. |
| 7,494,434 B2 | 2/2009 | McVicar et al. |
| 7,530,911 B2 | 5/2009 | Serkh |
| 7,892,125 B2 | 2/2011 | Nelson et al. |
| 7,901,310 B2 | 3/2011 | Lolli et al. |
| 8,092,328 B2 | 1/2012 | Dec et al. |
| 8,353,795 B2 | 1/2013 | Montani et al. |
| 8,439,780 B2 | 5/2013 | Ruffini et al. |
| 8,821,328 B2 | 9/2014 | Jud et al. |
| 2002/0039943 A1 | 4/2002 | Serkh |
| 2002/0086751 A1 | 7/2002 | Bogner et al. |
| 2003/0109342 A1 | 6/2003 | Oliver et al. |
| 2003/0153420 A1 | 8/2003 | Rogers |
| 2003/0153421 A1 | 8/2003 | Liu |
| 2003/0176249 A1 | 9/2003 | Polster et al. |
| 2003/0216203 A1 | 11/2003 | Oliver et al. |
| 2003/0220164 A1 | 11/2003 | Tamai |
| 2004/0002401 A1 | 1/2004 | Iverson |
| 2004/0043854 A1 | 3/2004 | Fraley, Jr. et al. |
| 2004/0072642 A1 | 4/2004 | Serkh |
| 2004/0077446 A1 | 4/2004 | Manning |
| 2004/0087401 A1 | 5/2004 | Serkh |
| 2005/0096168 A1 | 5/2005 | Serkh et al. |
| 2005/0181901 A1 | 8/2005 | Shin et al. |
| 2006/0100051 A1 | 5/2006 | Di Giacomo et al. |
| 2006/0217222 A1 | 9/2006 | Lolli et al. |
| 2006/0287146 A1 | 12/2006 | McVicar et al. |
| 2007/0037648 A1 | 2/2007 | Di Giacomo |
| 2008/0214342 A1 | 9/2008 | Montani et al. |
| 2008/0220919 A1 | 9/2008 | Antchak et al. |
| 2012/0318589 A1 | 12/2012 | Staley et al. |
| 2013/0040770 A1 | 2/2013 | Wolf et al. |
| 2013/0079185 A1 | 3/2013 | Schauerte et al. |
| 2013/0203535 A1 | 8/2013 | Mack et al. |
| 2013/0260932 A1 | 10/2013 | Adam et al. |

FOREIGN PATENT DOCUMENTS

| | | |
|---|---|---|
| DE | 10044645 A1 | 3/2002 |
| DE | 102011085122 A1 | 4/2013 |
| EP | 2128489 B1 | 8/2011 |
| EP | 2385272 A1 | 11/2011 |
| JP | 03028551 A | 2/1991 |
| WO | 2013142951 A1 | 10/2013 |
| WO | 2014100894 A1 | 7/2014 |
| WO | 2015196268 A1 | 12/2015 |

ROTARY TENSIONER

FIELD OF THE INVENTION

The invention relates to a tensioner, and more particularly, to a rotary tensioner having a rotary arm pivotally engaged with a base, a center of rotation of the rotary arm aligned with a base aperture center, a swing arm pivotally engaged with the rotary arm about a shaft, the shaft and swing arm each having a cooperating frustoconical portion, a bushing having a frustoconical portion in frictional engagement with the swing arm frustoconical portion.

BACKGROUND OF THE INVENTION

Most internal combustion engines comprise accessories such as power steering, an alternator and air conditioning to name a few. These accessories are typically driven by a belt. A tensioner is typically used to apply a preload to the belt in order to prevent slippage. The tensioner can be mounted to an engine mounting surface The engine may further comprise a start-stop system whereby the engine will shut down when the vehicle is not in motion, and when a driver command is received to proceed the engine will restart.

The start-stop function will tend to reverse loading on the belt. Hence, tensioners are available to accommodate belt load reversals. The tensioner may comprise one or more components which independently pivot in order to properly apply a required belt preload force in both belt drive directions. The tensioner may also be mounted directly to an accessory such as an alternator in order to save space in the engine bay.

Representative of the art is WO2014/100894 which discloses a tensioner for tensioning an endless drive member that is engaged with a rotary drive member on a shaft of a motive device. The tensioner includes a base that is mountable to the motive device, a ring that is rotatably supported by the base in surrounding relationship with the shaft of the motive device and which is rotatable about a ring axis, a tensioner arm pivotally mounted to the ring for pivotal movement about an arm pivot axis, and first and second tensioner pulleys. The first tensioner pulley is rotatably mounted to the tensioner arm. The tensioner arm is biased towards a first span of the endless drive member on one side of the rotary drive member. The second tensioner pulley is rotatably mounted at least indirectly to the ring and is biased towards a second span of the endless drive member on another side of the rotary drive member. The ring is rotatable in response to hub loads in the first and second tensioner pulleys that result from engagement with the first and second spans of the endless drive member.

What is needed is a tensioner having a rotary arm pivotally engaged with a base, a center of rotation of the rotary arm aligned with a base aperture center, a swing arm pivotally engaged with the rotary arm about a shaft, the shaft and swing arm each having a cooperating frustoconical portion, a bushing having a frustoconical portion in frictional engagement with the swing arm frustoconical portion. The present invention meets this need.

SUMMARY OF THE INVENTION

The primary aspect of the invention is to provide a tensioner having a rotary arm pivotally engaged with a base, a center of rotation of the rotary arm aligned with a base aperture center, a swing arm pivotally engaged with the rotary arm about a shaft, the shaft and swing arm each having a cooperating frustoconical portion, a bushing having a frustoconical portion in frictional engagement with the swing arm frustoconical portion.

Other aspects of the invention will be pointed out or made obvious by the following description of the invention and the accompanying drawings.

The invention comprises a tensioner comprising a base having a base aperture, the base aperture disposed to receive a driven component, a rotary arm pivotally engaged with the base, an axis of rotation of the rotary arm aligned with a base aperture center, a first pulley journalled to the rotary arm, a swing arm pivotally engaged with the rotary arm about a shaft, the shaft and swing arm each having cooperating frustoconical portions, a torsion spring biasing the pivot arm, a second pulley journalled to the swing arm, a bushing having a frustoconical portion in frictional engagement with the swing arm frustoconical portion, the bushing in fixed relation to the shaft or pivot arm, and a first damping ring frictionally engaged between the rotary arm and the base, a Belleville spring in pressing engagement whereby a normal force is applied to the first damping ring.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
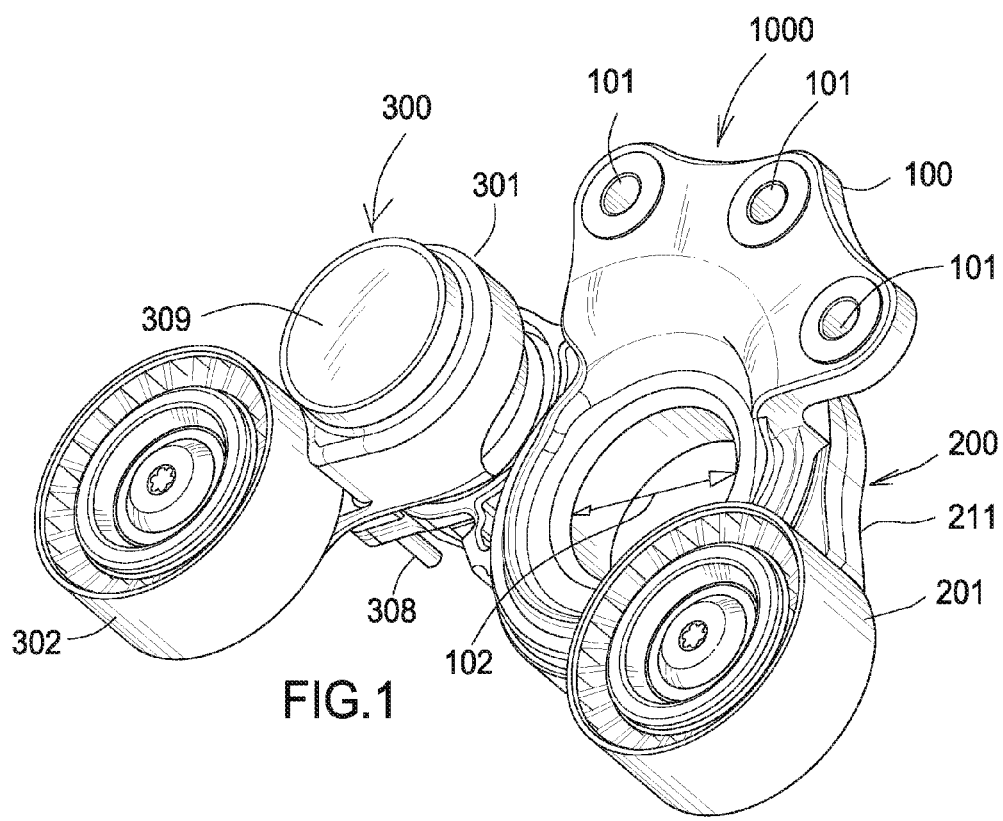
FIG. 1 is a top perspective view.

FIG. 1 is a top perspective view. Rotary tensioner 1000 comprises a base 100, rotary arm 202, and swing arm tensioner 300.

Base 100 comprises holes 101 for attaching the tensioner to a mounting surface such as an engine alternator (not shown). Each hole 101 receives a fastener such as a bolt (not shown). Base 100 comprises an aperture 102. Aperture 102 has a large enough diameter to accommodate and encircle a driven component such as an alternator pulley (not shown). A drive belt (not shown) engages the driven component, see FIG. 6.

Rotary arm 202 comprises a first radial projection 210 and a second radial projection 211. Rotary arm 202 further comprises an aperture 209. Aperture 209 is a large enough diameter to accommodate a driven component such as an alternator pulley (not shown). Aperture 102 and aperture 209 are coaxial. Rotary arm 202 pivots about base 100 and thereby aperture 102, namely, rotary arm 202 has an axis of rotation A-A that is aligned with the center (B) of the base aperture 102. The rotary arm axis of rotation also aligns with the axis of rotation of a driven pulley, such as an alternator pulley (not shown).

Pulley 201 is journalled to rotary arm 202 on projection 210 by a bearing 207. Pulley 201 engages a drive belt (not shown) which drives a driven engine accessory, for example, an alternator pulley. Bolt 208 secures bearing 207 to projection 210. Dust cover 212 prevents debris from entering bearing 207.

Tensioner 300 comprises a swing arm 301. Swing arm 301 pivots about shaft 304. Shaft 304 can be press fit or threaded into projection 211 on pivot arm 301. Shaft 304 is disposed radially outward from the base aperture. Pulley 302 is journalled to swing arm 301 on bearing 310. Pulley 302 engages a drive belt (not shown). Torsion spring 303 urges swing arm 301 into contact with the drive belt (not shown), thereby applying a belt load. A belt load is advantageous to prevent belt slippage, wear and noise during operation. Pivotal movement of swing arm 301 is coordinated with rotary movement of rotary arm 202.

In operation swing arm 301 presses on a drive belt thereby applying a belt load. The swing arm load also causes a reaction whereby pulley 201 presses on the drive belt by pivotal movement of rotary arm 202. Movement of swing arm 301 and rotary arm 202 allows the inventive device to accommodate various system and belt operating characteristics. Pulley 201 and pulley 302 are coplanar with a driven pulley (not shown).

Figure 2:
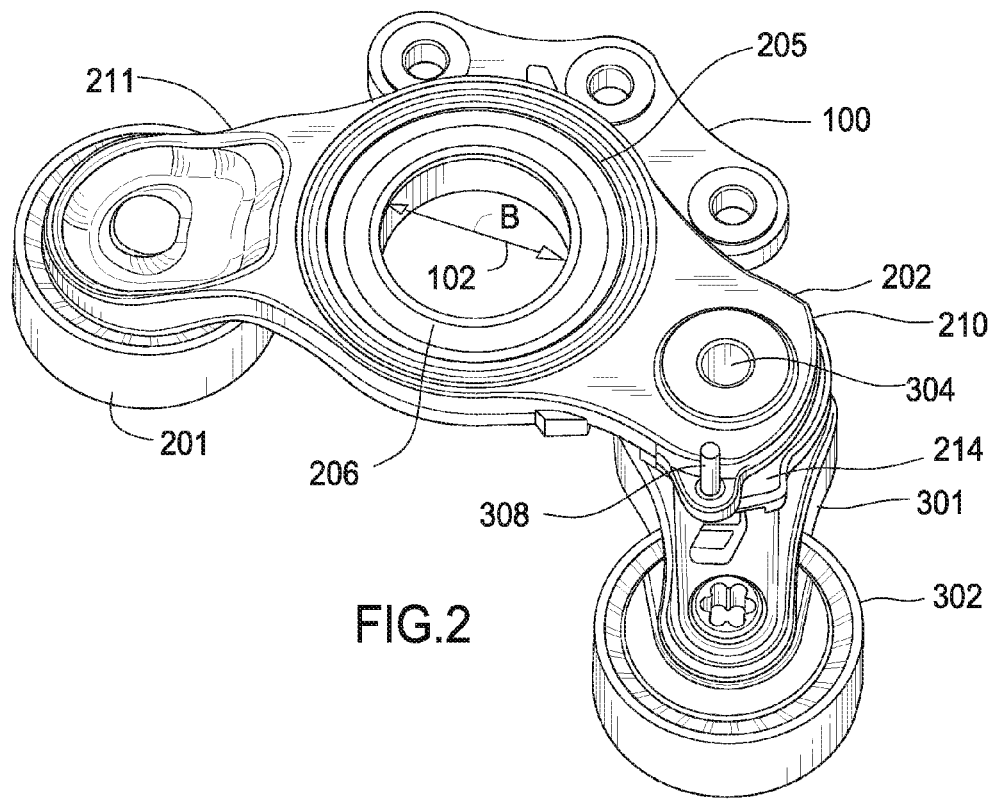
FIG. 2 is a bottom perspective view.

FIG. 2 is a bottom perspective view. In operation a drive belt (not shown) engages a driven pulley such as an alternator pulley that projects through aperture 209. The drive belt also engages pulleys 201 and 302.

Figure 3:
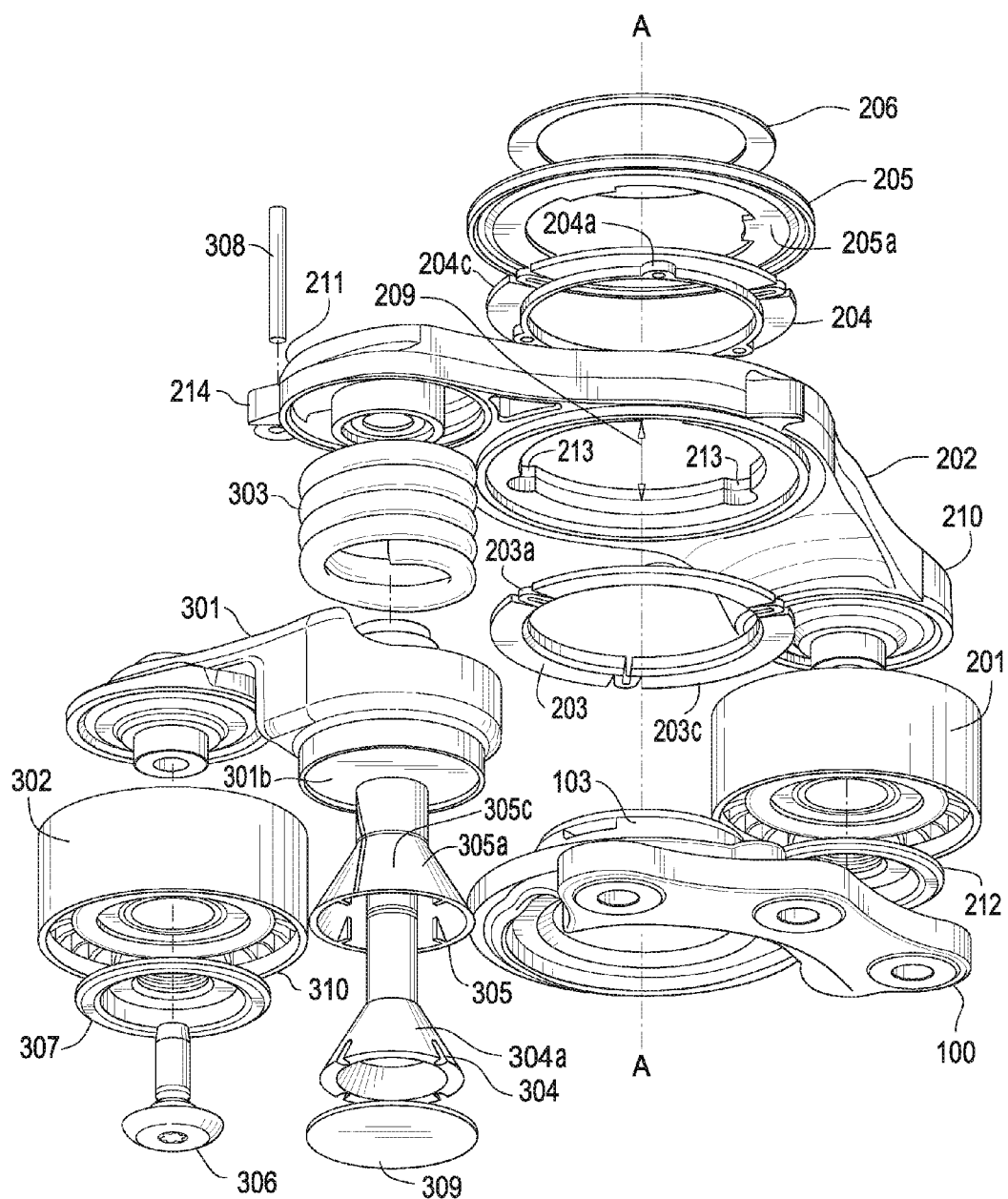
FIG. 3 is an exploded view.

FIG. 3 is an exploded view. Shaft 304 comprises a frustoconical portion 304a. Bushing 305 is disposed between shaft 304 and swing arm 301. Bushing 305 comprises a frustoconical portion 305a.

Bushing 305 is held in fixed relation to shaft 304 by tabs 305b on bushing 305 which engage slots 304b in shaft 304. Swing arm 301 pivots about shaft 304 on bushing 305. A frictional relation between bushing 305 and swing arm 301 acts to damp pivotal movement of swing arm 301. In an alternate embodiment bushing 305 is held in fixed relation to the pivot arm. In yet another embodiment bushing 305 is not held in fixed relation to either the pivot arm or the shaft.

Damping ring 203 is disposed between base 100 and rotary arm 202. Damping ring 204 is disposed opposite damping ring 203. Member 205 holds damping ring 204 to base 100. Belleville spring 206 applies a compressive normal force to member 205 which in turn applies a normal force to each damping ring 203, 204. The normal force multiplied by the frictional coefficient between the damping rings and the base creates a frictional force which in turn damps movement of rotary arm 202. Belleville spring 206 is held in a compressed state due to a material deformation based assembly process applied to base 100, which in turn holds the tensioner together.

Each tab 203a engages a receiving portion 213 of rotary arm 202. Each tab 204a also engages receiving portion 213 of rotary arm 202. Therefore, each damping ring 203 and 204 move in fixed relation to rotary arm 202. Surface 203c frictionally engages surface 104 of base 100. Surface 205a frictionally engages surface 204c.

Pin 308 engages rotary arm portion 214 and pivot arm 301. Pin 308 holds pivot arm 301 in a predetermined position in order to facilitate installation of a drive belt (not shown). Pin 308 is then removed once installation of the tensioner and belt are complete and the system is put into operation.

Figure 4:
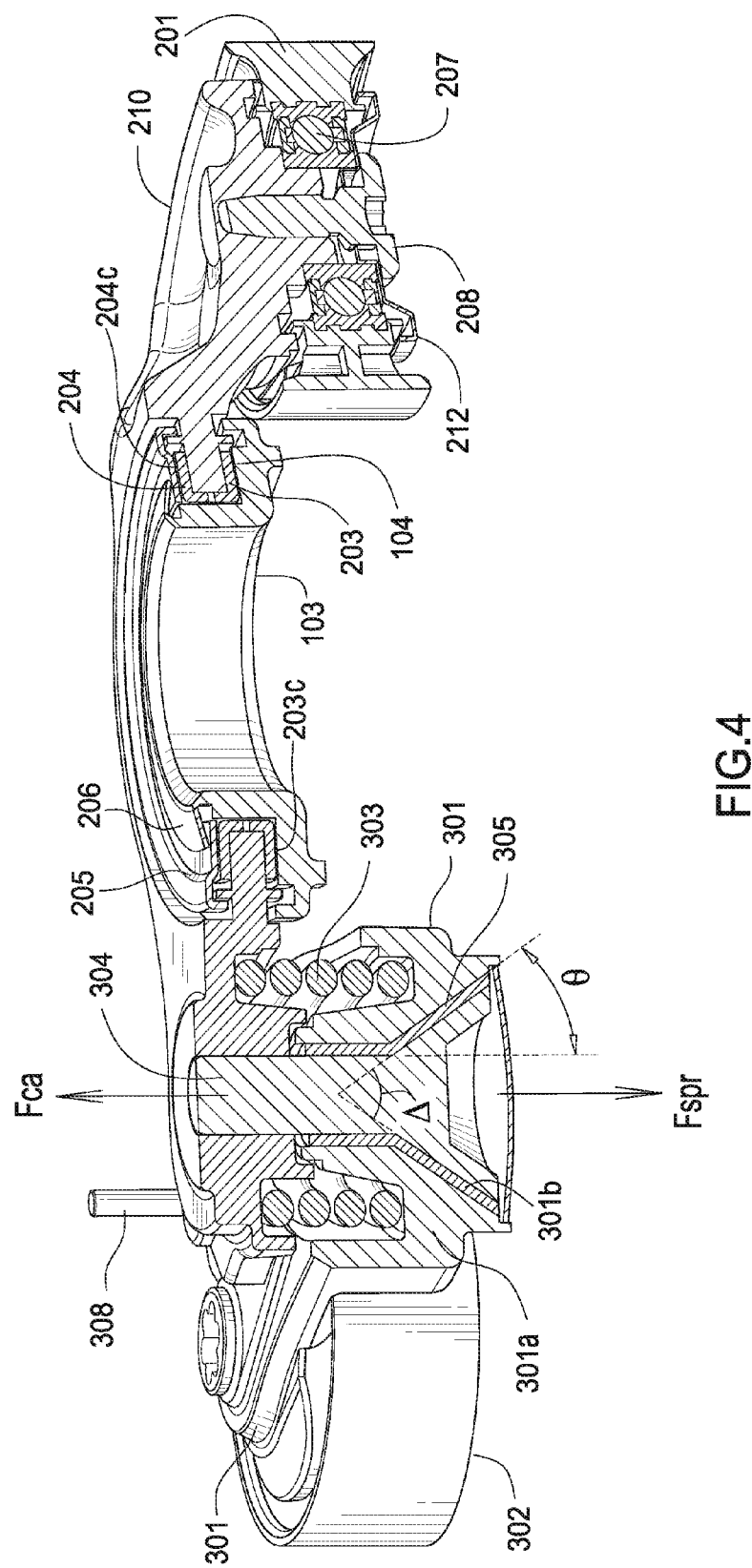
FIG. 4 is a cross-sectional view.

FIG. 4 is a cross-sectional view. Shaft 304 comprises a frustoconical portion 304a. A conical angle θ is in the range of >0 degrees to <90 degrees. By way of example, the instant embodiment comprises a conical angle θ of approximately 30 degrees.

Bushing portion 305a has a frustoconical shape to cooperatively match the form of portion 304a. Bushing 305 is disposed between pivot arm 301 and shaft 304. Pivot arm 301 pivots on bushing 305. Cap 309 is affixed to pivot arm 301 and acts as a seal to prevent debris from entering between bushing 305 and pivot arm 301.

In operation torsion spring 303 is in axial compression which creates an axial spring force $F_{spr}$. The axial spring force presses surface 305c of bushing 305 into surface 301b of pivot arm 301. The resulting frictional force between surface 301b and surface 305c damps pivotal movement of pivot arm 301. Depending on the axial spring force and the shape of the frustoconical portion, the damping torque can have a wide range for example, +/−1 to +20 Nm. The preferred range is approximately 1 Nm to approximately 8 Nm. By way of example, a 850N axial spring force and 30 degree conical angle with a 36 mm maximum and 16 mm minimum diameter of portion 305a and a coefficient of friction of 0.16 gives a damping torque of approximately +/−3.7 Nm. Numbers provided herein are by way of example and are not intended to limit the scope of the invention.

The apex of angle Δ of the frustoconical portion 305a projects in the direction opposite the axial spring force vector $F_{spr}$. This orientation firmly engages the pivot arm frustoconical portion 301b with the shaft conical portion 304a. This in turn is the basis of the reaction force $F_{cr}$, a normal of which to surface 305c causes the frictional damping force between the bushing 305 and surface 301b. For example, in this embodiment the apex angle Δ is 60°. Apex angle Δ=2×θ.

The frustoconical form enhances damping durability due to the enlarged surface area of the bushing portion 305a as compared to a purely cylindrical bushing. It also optimizes the use of axial force due to the wedge effect: $F_n = F_{spr}(\sin \theta)$. $F_n$ is the normal force on surface 305c. $F_{spr}$ is the spring force. It also provides improved alignment of pivot arm 301 on shaft 304 which in turn results in improved alignment of pulley 302 with a drive belt.

Figure 5:
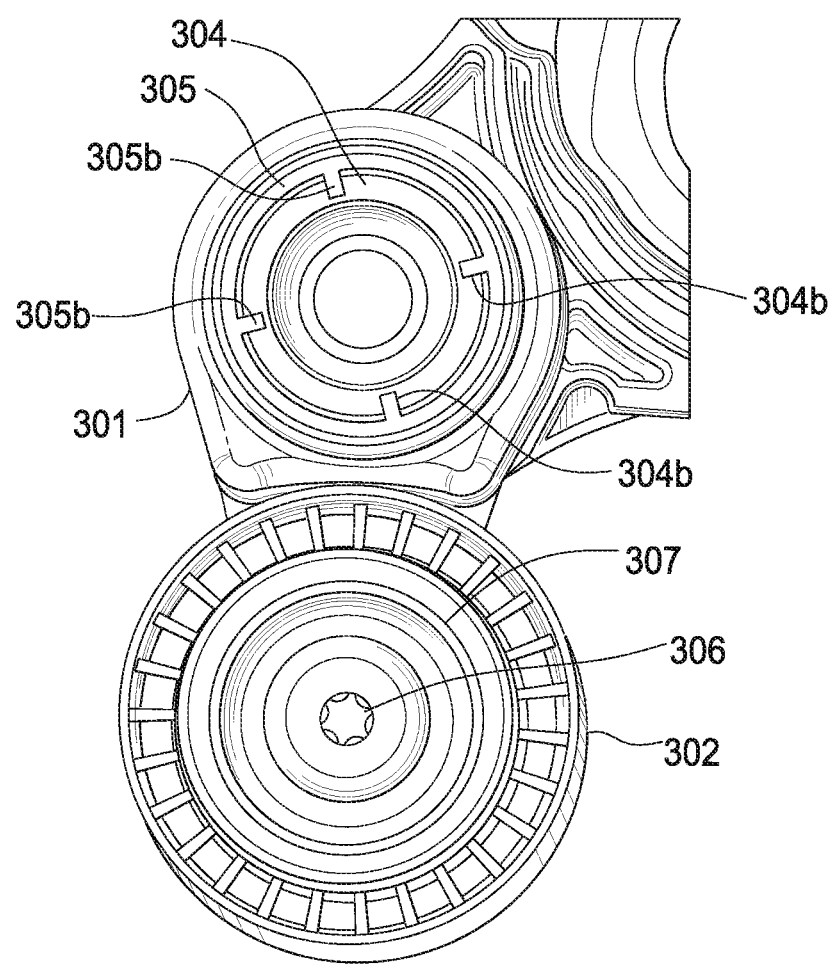
FIG. 5 is a detail of FIG. 1.

FIG. 5 is a detail of FIG. 1. Bolt 306 secures bearing 310 to swing arm 301. Dust shield 307 protects bearing 310 from debris. Each tab 305b engages a slot 304b to prevent movement of bushing 305.

Figure 6:
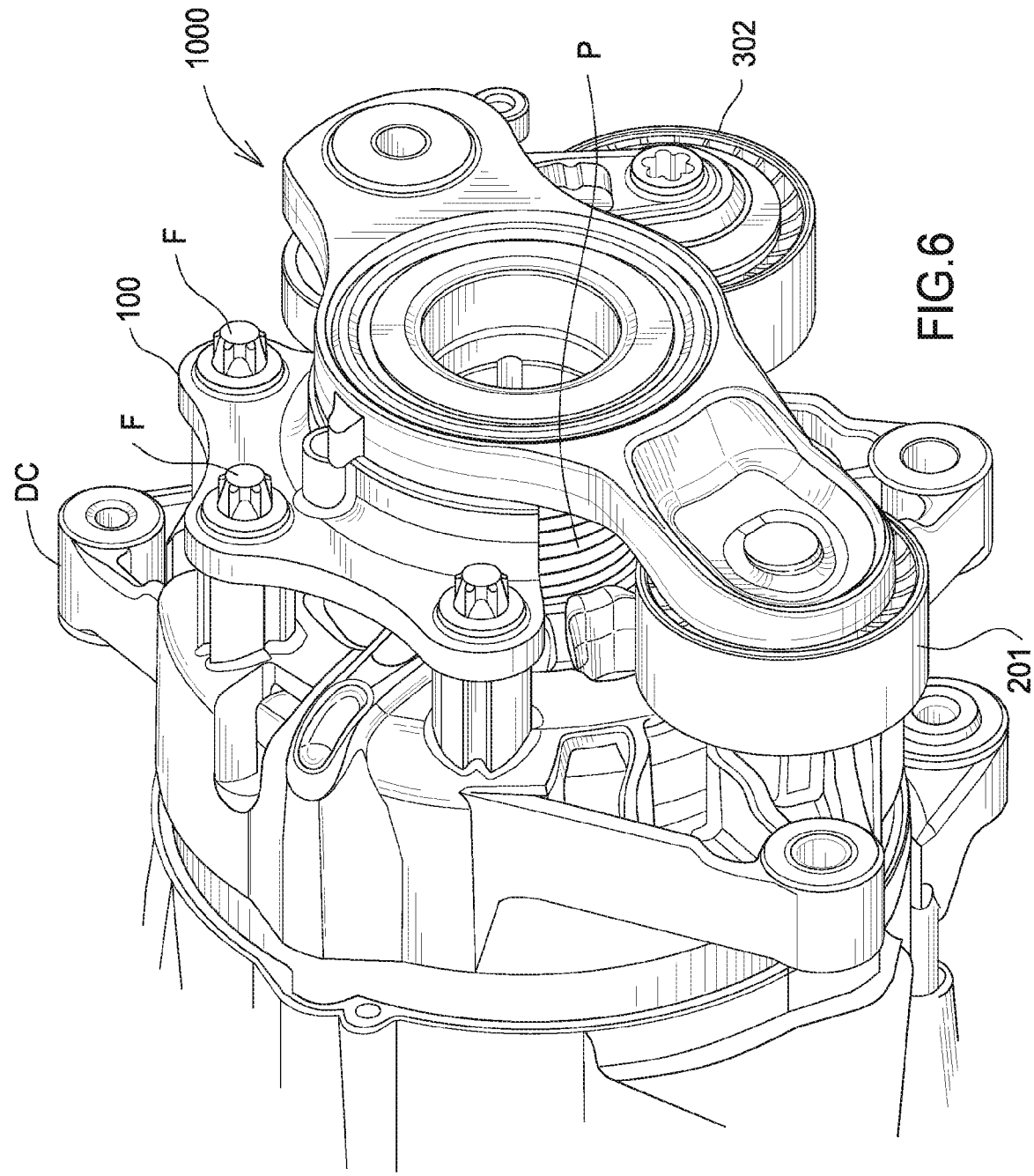
FIG. 6 is a perspective view of the device mounted to a driven component.

FIG. 6 is a perspective view of the device mounted to a driven component. Tensioner 1000 is mounted to a driven component DC. Driven component DC comprises a pulley P. Driven component DC may comprise an alternator, starter-generator, or other vehicle engine component. Fasteners F fix tensioner 1000 to the driven component. A belt (not shown) engages pulley 201, pulley 302 and pulley P. The belt drives component DC through pulley P.

Although a form of the invention has been described herein, it will be obvious to those skilled in the art that variations may be made in the construction and relation of parts and method without departing from the spirit and scope of the invention described herein.

We claim:
1. A tensioner comprising:
a base having a base aperture, the base aperture disposed to receive a driven component;
a rotary arm pivotally engaged with the base, an axis of rotation of the rotary arm aligned with a base aperture center, a first pulley journalled to the rotary arm;
a swing arm pivotally engaged with the rotary arm about a shaft, the shaft and swing arm each having cooperating frustoconical portions, a torsion spring biasing the pivot arm, a second pulley journalled to the swing arm;

a bushing having a frustoconical portion in frictional engagement with the swing arm frustoconical portion, the bushing in fixed relation to the shaft or pivot arm; and a first damping ring frictionally engaged between the rotary arm and the base, a Belleville spring in pressing engagement whereby a normal force is applied to the first damping ring.

2. The tensioner as in claim 1, wherein the shaft frustoconical portion comprises an apex angle Δ which projects in the direction opposite a torsion spring axial spring force vector $F_{spr}$.

3. The tensioner as in claim 1 further comprising a second damping ring frictionally engaged between the rotary arm and the base, the second damping ring disposed opposite the first damping ring relative to a base frictional surface.

4. The tensioner as in claim 1, wherein the rotary arm comprises a rotary arm aperture aligned with the base aperture.

5. The tensioner as in claim 1, wherein the bushing is held in fixed relation to the shaft.

6. The tensioner as in claim 1, wherein the bushing is held in fixed relation to the pivot arm.

7. The tensioner as in claim 1, wherein the first damping ring is held in fixed relation to the rotary arm.

8. The tensioner as in claim 3, wherein the second damping ring is held in fixed relation to the rotary arm.

9. The tensioner as in claim 1, wherein the first damping ring is held in fixed relation to the base.

10. The tensioner as in claim 3, wherein the second damping ring is held in fixed relation to the base.

11. A tensioner comprising:

a base having a base aperture, the base aperture disposed to encircle a driven component;

a rotary arm pivotally engaged with the base, an axis of rotation of the rotary arm aligned with a base aperture center, a first pulley journalled to the rotary arm, the rotary arm comprises a rotary arm aperture aligned with the base aperture;

a swing arm pivotally engaged with the rotary arm about a shaft, the shaft and the swing arm each having cooperating frustoconical portions, a torsion spring biasing the pivot arm, a second pulley journalled to the swing arm, the shaft frustoconical portion comprises an apex angle Δ which projects in the direction opposite a torsion spring axial spring force vector $F_{spr}$;

a bushing having a frustoconical portion in frictional engagement with the swing arm frustoconical portion, the bushing in fixed relation to the shaft; and a first damping ring frictionally engaged between the rotary arm and the base, a Belleville spring in pressing engagement whereby a normal force is applied to the first damping ring.

12. A tensioner comprising:

a base having a base aperture;

a rotary arm pivotally engaged with the base, an axis of rotation of the rotary arm aligned with a base aperture center, a first pulley journalled to the rotary arm, the rotary arm comprises a rotary arm aperture aligned with the base aperture;

a swing arm pivotally engaged with the rotary arm about a shaft, the shaft and swing arm each having cooperating frustoconical portions, a torsion spring biasing the pivot arm, a second pulley journalled to the swing arm, the shaft frustoconical portion comprises an apex angle Δ which projects in the direction opposite a torsion spring axial spring force vector $F_{spr}$;

a bushing having a frustoconical portion in frictional engagement with the swing arm frustoconical portion, the bushing having a fixed relation to the shaft; and a first damping ring frictionally engaged between the rotary arm and the base, a Belleville spring in pressing engagement to apply a normal force to the first damping ring.

\* \* \* \* \*